(12) United States Patent
Soubirane et al.

(10) Patent No.: US 9,697,703 B2
(45) Date of Patent: Jul. 4, 2017

(54) CAPSULE FOR GUIDING LIGHT AND ASSOCIATED CONTACTLESS PAYMENT DEVICE

(71) Applicant: INGENICO GROUP, Paris (FR)

(72) Inventors: Alain Soubirane, Bourg-les-Valence (FR); Richard Allirot, Corenc (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/857,375

(22) Filed: Sep. 17, 2015

(65) Prior Publication Data

US 2016/0078732 A1    Mar. 17, 2016

(30) Foreign Application Priority Data

Sep. 17, 2014 (FR) ...................... 14 58795

(51) Int. Cl.
| | |
|---|---|
| *G08B 5/00* | (2006.01) |
| *G08B 5/36* | (2006.01) |
| *G06Q 20/32* | (2012.01) |
| *G08B 5/30* | (2006.01) |
| *G06K 19/077* | (2006.01) |

(52) U.S. Cl.
CPC ......... *G08B 5/36* (2013.01); *G06K 19/07715* (2013.01); *G06Q 20/3278* (2013.01); *G08B 5/30* (2013.01)

(58) Field of Classification Search
CPC .......... F21V 11/08; F21V 11/14; F21V 14/00; F21V 14/08; F21V 17/00; F21V 17/02; G08B 5/30; G08B 5/36; G06Q 20/3278; G06K 19/07715
USPC ............ 340/815.4, 815.45, 691.1; 455/41.1, 455/41.2; 235/380, 375, 492; 705/64, 705/70, 26.1, 35, 39, 42; 250/216; 356/399; 359/227, 234, 236; 362/23, 26, 362/27, 248, 277, 282, 319, 322, 351
See application file for complete search history.

(56) References Cited

U.S. PATENT DOCUMENTS 7,096,046 B2 * 8/2006 Shapiro ................... H04M 1/22
340/815.4

FOREIGN PATENT DOCUMENTS

KR         100642199 B1     10/2006

OTHER PUBLICATIONS

English Translation of the Written Opinion dated May 27, 2015 for corresponding French Application No. 1458795, filed Sep. 17, 2014.
French Search Report and Written Opinion dated May 27, 2015 for corresponding French Application No. 1458795, filed Sep. 17, 2014.

* cited by examiner

*Primary Examiner* — Thomas Mullen
(74) *Attorney, Agent, or Firm* — David D. Brush; Westman, Champlin & Koehler, P.A.

(57) ABSTRACT

A capsule is provided that aligns with at least one light source. The capsule includes a rim having its opaqueness interrupted to as to form at least four transparent portions. The capsule is capable of being oriented according to at least two positions: a first position in which two of the at least four portions, simultaneously let through light coming from the at least one light source; and a second position in which the rim blocks light coming from the at least one light source.

9 Claims, 5 Drawing Sheets

2
CAPSULE FOR GUIDING LIGHT AND ASSOCIATED CONTACTLESS PAYMENT DEVICE

1. FIELD OF THE DISCLOSURE

The present disclosure pertains to the field of payment. The present technique pertains more specifically to the field of contactless payment, such as for example contactless payment terminals. Specifically, the proposed technique pertains to a contactless USB payment stick, which uses a light signal to indicate the fact that an operation for presenting a contactless payment means can be performed.

The proposed technique pertains more particularly to means for controlling the diffusion of light indicating that an operation for presenting a contactless payment means can be performed.

2. PRIOR ART

Contactless payment terminals enable a user to make a transaction by using a bank card or a mobile terminal without the insertion of the card and without the entry of a confidential code. The payment, based on NFC (near field communication) technology is made between the chip of the card or of the mobile terminal, and the payment terminal positioned at a distance of some centimeters. In most cases, the payment terminal is equipped with a contactless payment logo telling the user where he should place his card.

There is a variety of these payment terminals which are fixed or mobile. Since very recently, USB (Universal Serial Bus) contactless reading devices are being developed, especially enabling a user to carry out contactless card-reading operations from home, by inserting the end of the key into the USB port of his terminal (for example a computer, a tablet, etc.).

Most contactless reading USB devices known in the prior art have a body, containing especially an electronic circuit and one or more light sources that are to be lit up to inform the user that he has to present his contactless device so that data is exchanged between this device and the contactless reading USB device.

The drawback of this type of USB device is that it cannot be used to make payment. This is particularly true of highly compact USB stick type devices such as the "ACR122T USB Token NFC Reader" by the firm ACS Limited. On the one hand, this type of USB stick does not comply with the standards for contactless payment and on the other hand, this type of device does not ensure that the user is informed of the instant at which he must present his contactless payment means to the reader to make a potential payment. Indeed, for a contactless USB key to be used as a payment terminal, it must first of all comply with security standards. Secondly, the contactless payment logo often placed on the surface must be properly oriented so as to face the user when he connects the stick to his computer, enabling the user, so to speak, to perceive the operation of this stick and more particularly be informed of the instant at which he must present his payment means (contactless card or mobile terminal). Indeed, when no particular technology is provided, the user can for example see the logo upside down or oriented at any angle whatsoever relative to his computer. Besides, the light signal indicating the instant of payment is not necessarily clearly visible given the limited size of the light sources. It can thus be interesting to provide complementary illumination on the body of the key.

3. SUMMARY

The present technique proposes an ergonomic and simple means to overcome the drawbacks of the prior-art solutions.

To this end, the proposed technique pertains to a capsule to be aligned with at least one light source. Such a capsule comprises an opaque periphery or rim, which is interrupted so as to form at least four transparent portions, said capsule being capable of being oriented in at least two positions:
  a first position in which two of said at least four portions simultaneously let through light coming from said at least one light source;
  a second position in which said rim blocks light coming from said at least one light source.

Thus, when the capsule is in the first position, it gets lit up. However, if the capsule is in the second position it remains "extinguished" or "off".

According to one particular characteristic, said capsule is cylindrical and comprises a base in its lower part, said rim being situated on the periphery of said base.

The cylindrical shape of the capsule enables it to be rotational and easily oriented by the user. The base enables the capsule to be centered on the support that carries it and enables the precise positioning of the rim relative to the light source.

According to one particular characteristic, said capsule comprises at least one ergot or pin disposed on the peripheral surface surmounting said base.

The pin cooperates with a complementary element, thus blocking the capsule in its rotation in its first position in which the transparent portions of the rim simultaneously allow light to pass through.

According to one particular characteristic, said capsule comprises gripping means on its surface.

According to one particular characteristic, said gripping means comprise protrusions arranged in the vicinity of the edges of said capsule.

It is advantageous to be able to make the capsule turn without the user's finger sliding on its surface so that the capsule can be easily positioned in the desired position.

The present disclosure also pertains to a contactless payment device. Such a device comprises:
  a capsule as described here above;
  a support bearing a printed circuit and at least two light-emitting diodes disposed before a circular cavity made in said support;
  a ring having at least one recess on its inner periphery;
  said capsule being centered on said cavity of said support so as to be aligned with said at least two light-emitting diodes and said ring being positioned above said capsule which is kept free in rotation, said capsule being able to take at least two positions:
    a first position in which said at least one pin of said capsule is in contact with one end of said at least one recess of said ring, two of said at least four portions of said rim of said capsule simultaneously letting through the light coming from said at least two light-emitting diodes;
    a second position in which said at least one pin of said capsule is mobile between the two ends of said at least one recess, said rim of said capsule blocking the light coming from said at least two light-emitting diodes.

Thus, when a user makes the capsule rotate, the position in which it is illuminated is reached when the pin present on its periphery abuts one of the two ends of the recess of the ring. By contrast, if the stopping in rotation does not take place, the capsule remains "off".

4. LIST OF FIGURES

These characteristics as well as others shall appear more clearly from the following description of one embodiment, given by way of a simple illustratory and non-exhaustive example and from the appended figures, of which:

Figure 4A:
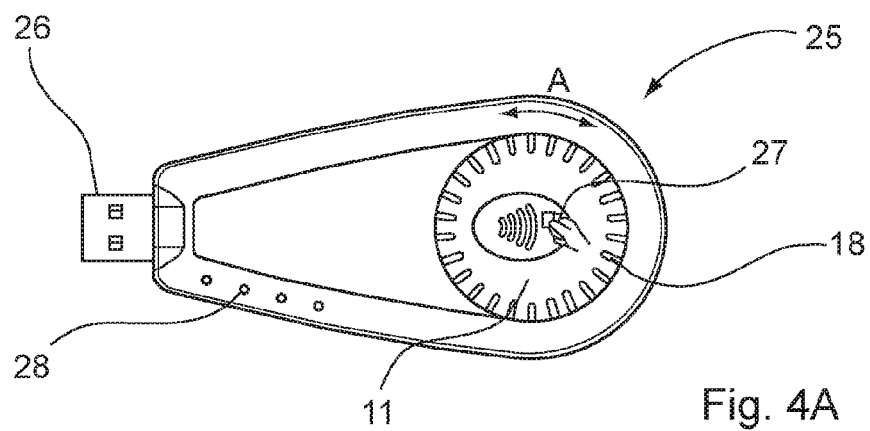
Figure 4B:
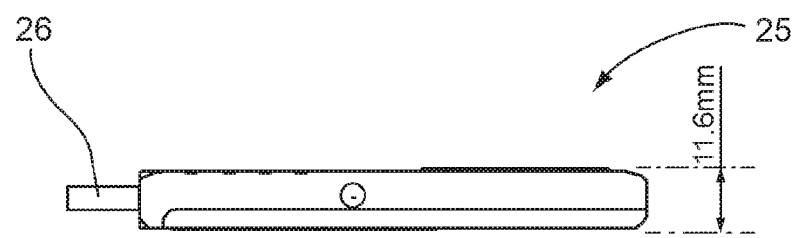
Figure 5A:
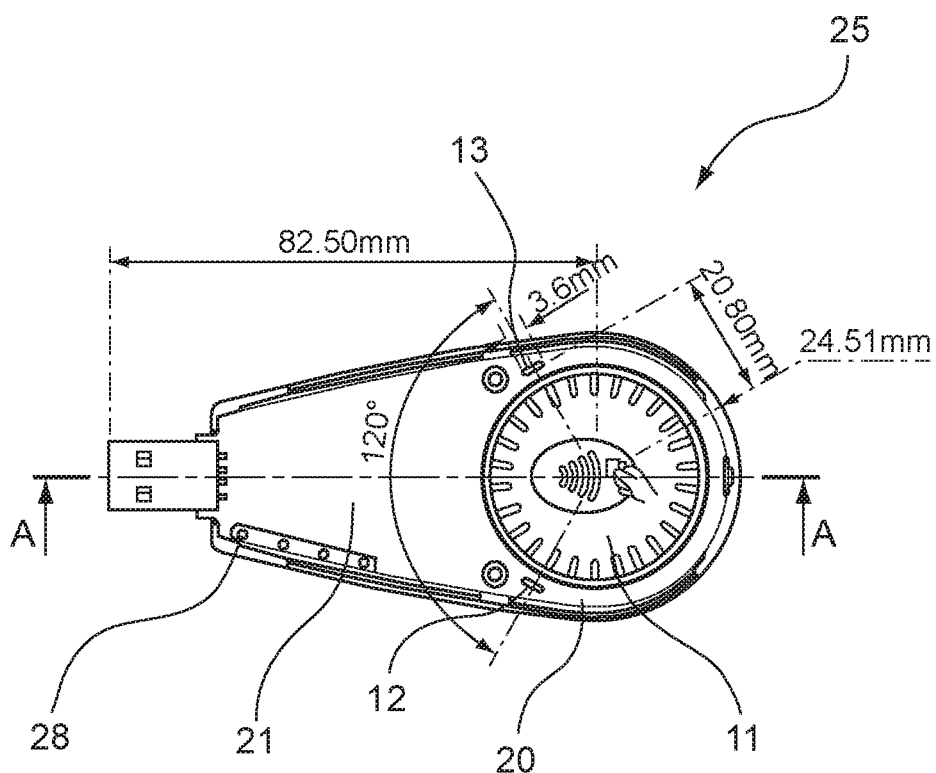
Figure 5B:
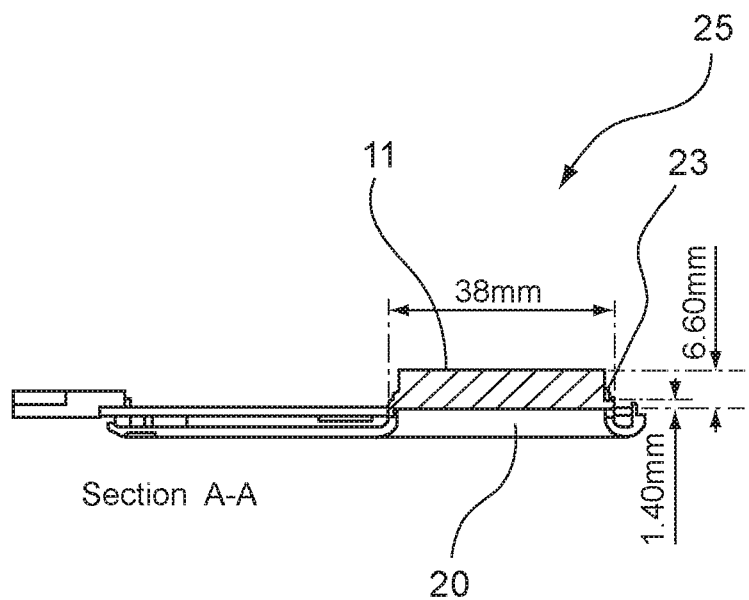
Figure 6:
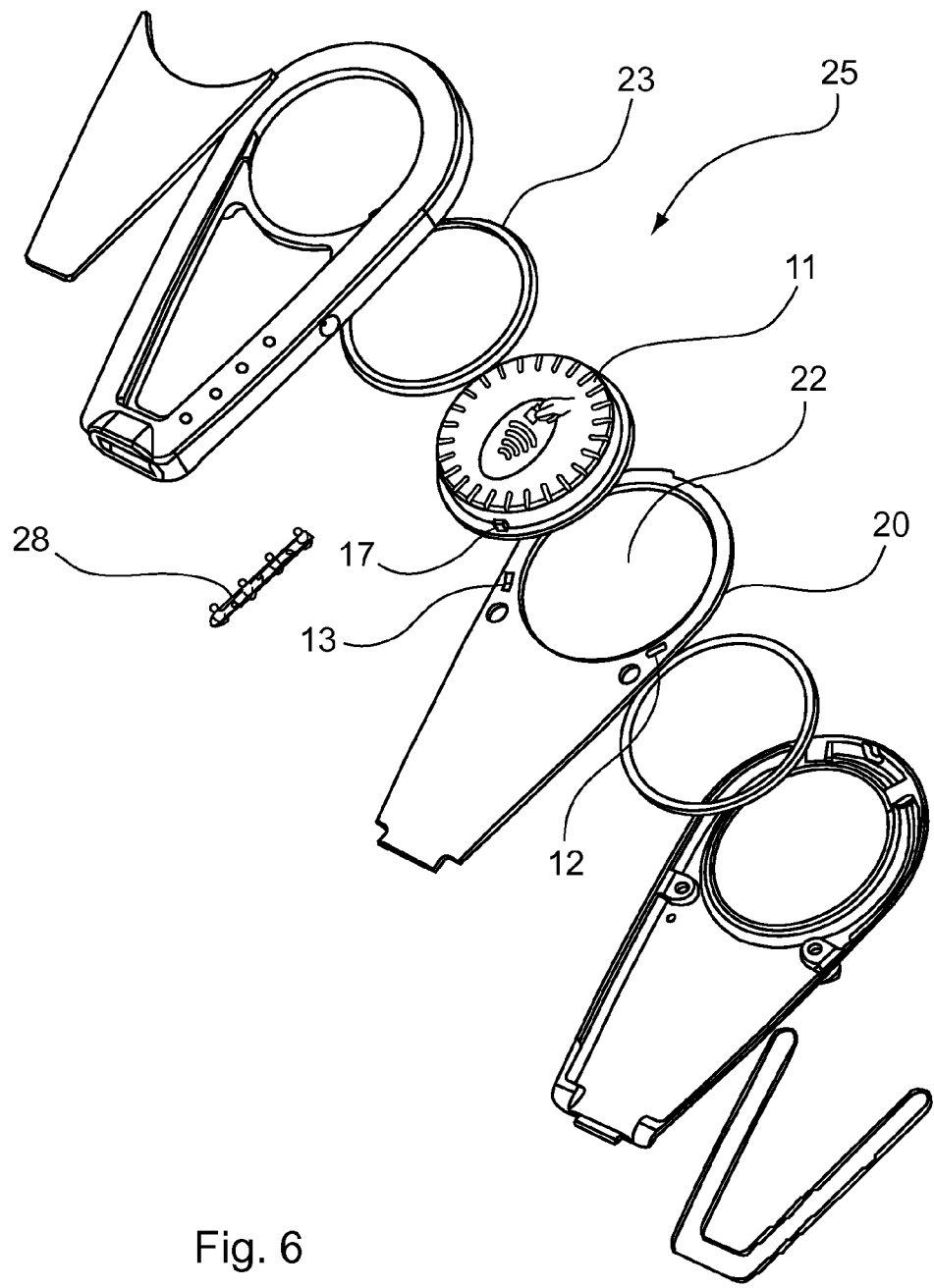

FIGS. 4A, 4B, 5A, 5B and 6 present a contactless payment device according to one particular embodiment:

FIG. 4A: device in a top view;

FIG. 4B: device in a side view;

FIG. 5A: sectional view of FIG. 4A;

FIG. 5B: section along A-A of FIG. 5A;

FIG. 6: exploded view.

Figure 7A:
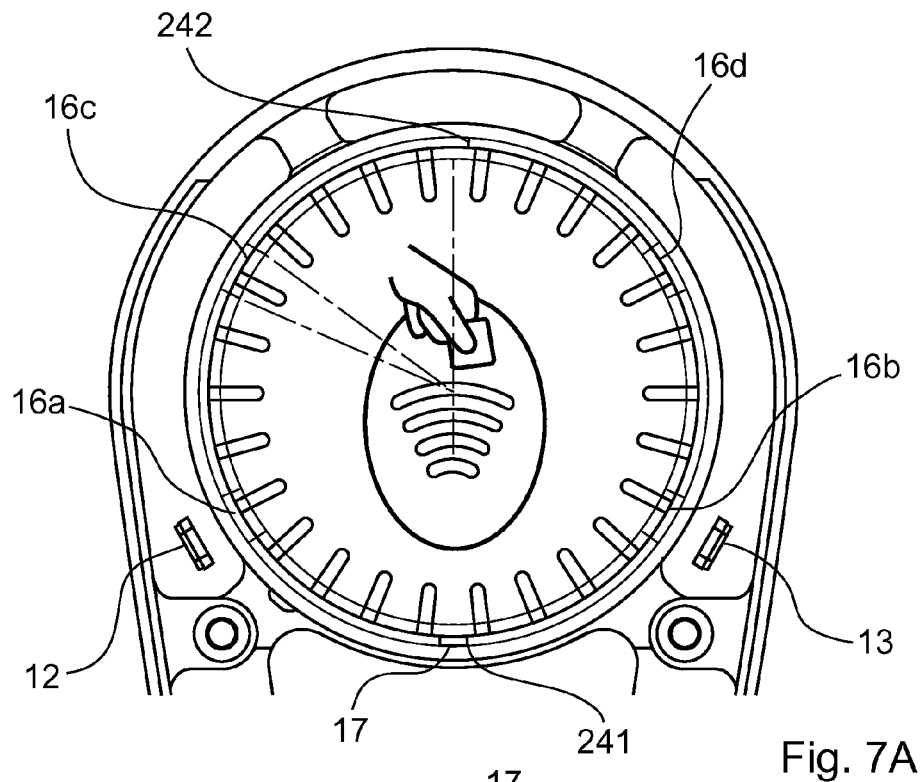
Figure 7B:
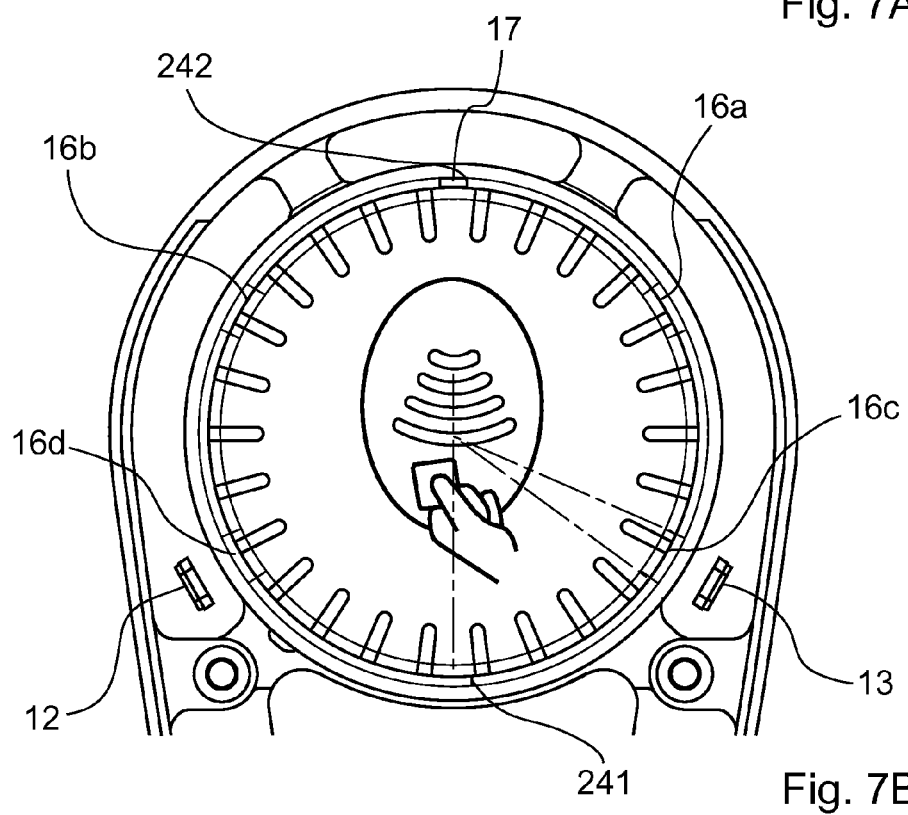

FIGS. 7A and 7B show two "correct" positions of the capsule in which it gets illuminated according to this same particular embodiment.

5. DESCRIPTION OF ONE EMBODIMENT OF THE DISCLOSURE

5.1. General Principle

Figure 1:
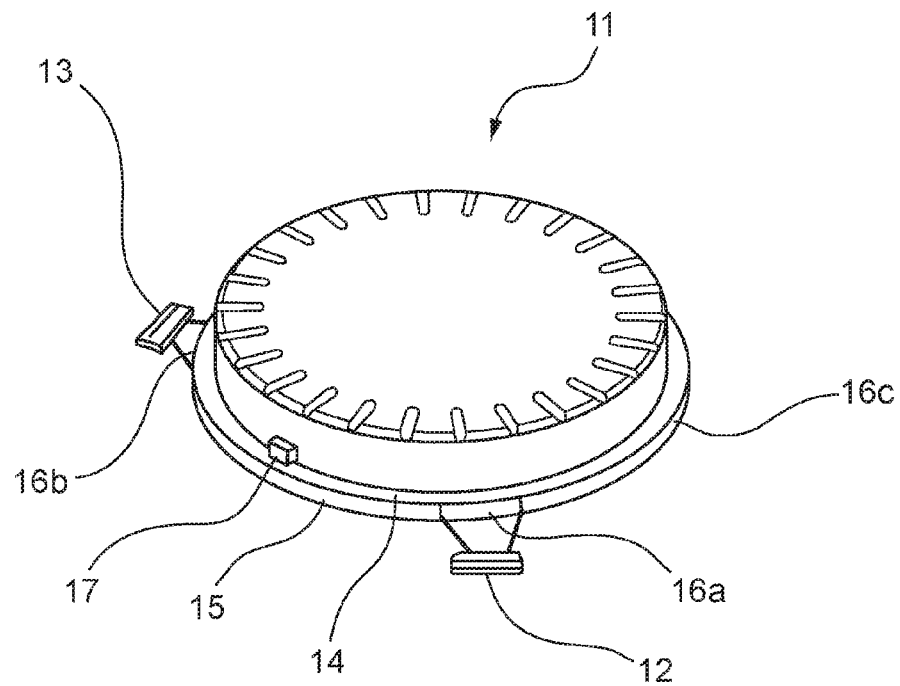
FIG. 1 is a perspective view of the capsule.

FIG. 1 illustrates a capsule 11 enabling the guidance of the light coming from one or two light-emitting diodes 12, 13 with which it is aligned. The proposed technique can be implemented with an unspecified number of these light-emitting diodes or with light sources of any other type. The capsule 11 comprises a base 14 in its lower part. This base 14 bears a rim 15 on its periphery. The periphery of the rim 15 is interrupted so as to form four transparent portions 16a, 16b, 16c, 16d.

Figure 2:
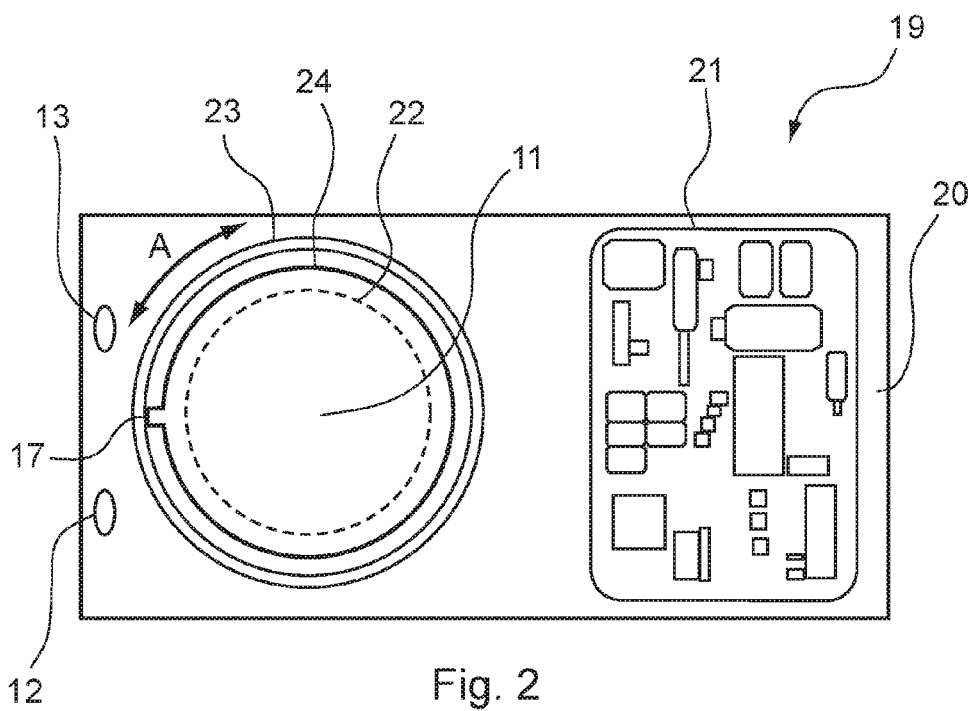
FIG. 2 illustrates a payment terminal of a general shape that implements the capsule.

Besides, a pin 17 is positioned above the base 14 as shown in FIGS. 1 and 2. Advantageously, the capsule has projecting portions or protrusions 18 arranged on its surface, enabling the user's finger to get a grasp thereon and to make the capsule rotate easily. These protrusions can if necessary be replaced by other gripping means such as grooves or picots.

The capsule 11 can be oriented by a user along at least two positions:

a first position in which two of the four portions 16a, 16b, 16c, 16 simultaneously let through the light coming from the two light-emitting diodes 12, 13;

a second position in which the rim 15 of the capsule 11 at least partially blocks the light coming from the two light-emitting diodes 12, 13.

The rim 15 can be opaque or reflective so as to stop light from being scattered in the capsule. This rim can be made in any unspecified way by the application of a film or paint to the periphery of the base, by micro-etching or by in-mould labeling (IML).

Figure 3:
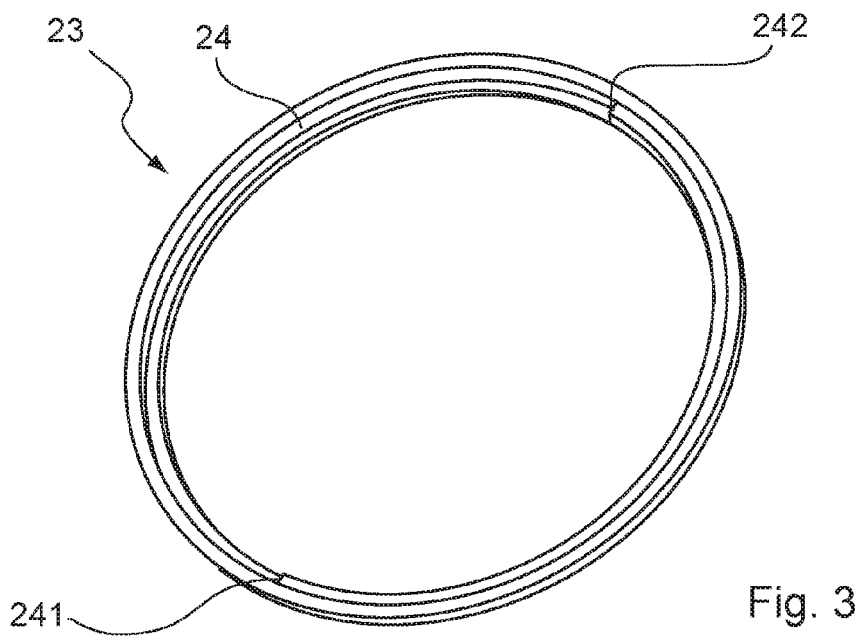
FIG. 3 shows the ring.

Thus, in the first position, the capsule is lit up; in the second position it remains at least partially "extinguished". Such a capsule is intended for insertion into a contactless payment terminal. An example of a contactless payment terminal 19 of any unspecified shape implementing a capsule 11 as described hereinabove is presented in FIG. 2. Such a payment device comprises mainly a support 20. The support 20 bears a printed circuit 21 and one or two light-emitting diodes 12, 13, and has a circular cavity 22 pierced through it. The transparent capsule 11 is centered on the circular cavity 22 and aligned with the light-emitting diodes 12, 13 so that it can guide the light that they diffuse when they are lit up. A ring 23 as represented in FIG. 3, comprising a recess 24 made along the internal edges, is positioned above the capsule. This ring is mounted tightly in a protective hood (not shown).

When a user makes the capsule rotate (in the motion indicated by the arrow A), its pin 17 is guided in the recess 24 made in the ring 23 until it abuts one of the two ends 241,242 of the recess. The rotational motion is interrupted and the capsule 11 is positioned in such a way that two of its four portions 16a, 16b, 16c, 16d of the rim 15 are simultaneously facing the two light-emitting diodes 12, 13. The user then knows that the capsule is situated in a position that enables it to be lit up.

5.2 Description of One Embodiment

FIGS. 4A and 4B, 5A and 5B, 6 and 7A and 7B, show a contactless payment device according to one particular embodiment, the payment device being a contactless payment USB stick.

FIGS. 4A and 4B present a contactless payment USB stick 25 about 107 mm long and about 12 mm thick. It has a plug 26 to be inserted into the USB port of a computer or a mobile terminal or again a tablet by a user wishing to make payment by means of a payment means compliant with the contactless standard.

Such a USB stick also integrates a capsule 11 with a diameter of 38 mm, preferably transparent and equipped with a gripping projection 18. On its surface, a contactless payment logo 27 is placed. The user can make the capsule 11 pivot (in the movement indicated by the arrow A) in order to orient the contactless payment logo 27 in a "correct" position, i.e. a position in which the logo is situated so as to be aligned with the plug 26 and the terminal (not shown) as can be seen in FIG. 4A. According to the proposed technique, the contactless payment logo can be placed in two "correct" positions of use, the second "correct" position being reached after a rotation of the capsule by 180°, starting from the first "correct" position.

The capsule 11 is positioned on a support 20 as illustrated in FIGS. 5A, 5B and 6, also comprising a printed circuit 11, a row of diodes 28, and two light-emitting diodes 12, 13. These light-emitting diodes 12, 13 are about 4 mm wide, disposed at 120° relative to each other and facing the capsule 11. A ring 23 is positioned above the capsule, leaving it free in rotation as represented in FIG. 6. According to one preferred embodiment, this ring has a recess 24 running along its internal surface over 180°. The ring 23 can for example be made out of POM (polyoxymethylene).

When the capsule is correctly oriented, and when the logo is aligned with the USB stick, the two portions 16a, 16b or the two portions 16c, 16d of the rim 15 of the capsule 11 simultaneously face two light-emitting diodes 12, 13. These two portions 16a, 16b or 16c, 16d thus diverge from each other by 120° and are about 4 mm wide. As illustrated in FIG. 7A, a first "correct" position of the logo 27 is reached when the pin 17 of the capsule 11 abuts a first end 241 of the recess 24 made on the internal surface of the ring 23, thus placing the portions 16a, 16b in a position such that they face the diodes 12, 13. A second "correct" position of the logo, presented in FIG. 7B, is reached when the capsule 11 undergoes a 180° rotation and when the pin 17 abuts a second end 242 of the recess 24, this time placing the portions 16c, 16d in a position such that they face the diodes 12, 13.

When the capsule 11 is not correctly oriented, and when the logo is not aligned with the USB stick, the light-emitting diodes 12, 13 face the rim 15 of the capsule. The light emitted by the light-emitting diodes 12, 13 therefore cannot be diffused or scattered in the capsule.

Thus, when the user has to make payment, the capsule is lit up if the logo is correctly positioned, at the same time as the row of diodes 28. This gives the user a clearer view of the instant at which he must bring his card closer to the contactless payment logo.

Although the present disclosure has been described with reference to one or more examples, workers skilled in the art will recognize that changes may be made in form and detail without departing from the scope of the disclosure and/or the appended claims.

The invention claimed is:

1. A contactless payment device comprising:
   a capsule comprising a rim having an opaque periphery, which is interrupted so as to form at least four transparent portions;
   a support bearing a printed circuit and at least two light-emitting diodes disposed before a circular cavity made in said support;
   a ring having at least one recess on an inner periphery of the ring;
   at least one pin disposed on the periphery of said rim, within said at least one recess of said ring;
   said capsule being centered on said cavity of said support so as to be aligned with said at least two light-emitting diodes and said ring being positioned above said capsule which is kept free in rotation, said capsule being rotatable between at least two positions:
   a first position in which at least one pin disposed on a peripheral surface of said capsule is in contact with a first end of said at least one recess of said ring, and two of said at least four portions of said rim of said capsule simultaneously let through light coming from said at least two light-emitting diodes; and
   a second position in which said at least one pin of said capsule is not in contact with the first end of said at least one recess, and said rim of said capsule blocks the light coming from said at least two light-emitting diodes.

2. The contactless payment device according to claim 1, wherein the capsule is cylindrical and comprises a base in its lower part, said rim being situated on a periphery of said base.

3. The contactless payment device according to claim 2, wherein said rim is formed of a film or paint applied to the periphery of said base.

4. The contactless payment device according to claim 1, wherein the capsule comprises gripping means on its surface.

5. The contactless payment device according to claim 4, said gripping means comprise protrusions arranged in the vicinity of edges of said capsule.

6. The contactless payment device according to claim 1, wherein said recess runs along the inner periphery of said ring over 180°.

7. The contactless payment device according to claim 1, wherein said rim is a micro-etched or in-mould labeling ring.

8. The contactless payment device according to claim 1, wherein said contactless payment device comprises a plug to be inserted in a USB port.

9. The contactless payment device according to claim 8, comprising a payment logo placed on the surface of said capsule.

* * * * *